United States Patent [19]

Beach et al.

[11] Patent Number: 5,714,538

[45] Date of Patent: *Feb. 3, 1998

[54] POLYMERIC DISPERSANTS FOR PIGMENTED INKS

[75] Inventors: Bradley L. Beach, Lexington; Anna Marie Pearson, Richmond; Jing Xiao Sun, Lexington; Richard B. Watkins, Frankfort, all of Ky.

[73] Assignee: Lexmark International, Inc., Lexington, Ky

[*] Notice: The term of this patent shall not extend beyond the expiration date of Pat. No. 5,656,077.

[21] Appl. No.: 578,138

[22] Filed: Dec. 26, 1995

[51] Int. Cl.[6] .................................... C08K 5/54
[52] U.S. Cl. ................ 524/504; 524/460; 524/555; 524/556; 524/606; 524/500; 524/588; 524/608
[58] Field of Search .................... 524/460, 555, 524/556, 606, 608, 588, 500, 504

[56] References Cited

U.S. PATENT DOCUMENTS

| | | | |
|---|---|---|---|
| 4,597,794 | 7/1986 | Ohta et al. | 106/20 C |
| 5,180,425 | 1/1993 | Matrick et al. | 102/22 R |
| 5,302,197 | 4/1994 | Wickramanayke et al. | 106/22 H |
| 5,310,778 | 5/1994 | Shor et al. | 524/556 |
| 5,656,071 | 8/1997 | Kappele et al. | 106/31.76 |

FOREIGN PATENT DOCUMENTS

| | | |
|---|---|---|
| 556649 | 8/1993 | European Pat. Off. . |
| 603469 | 6/1994 | European Pat. Off. . |

OTHER PUBLICATIONS

Trade Literature—Liponic EG-1, Lipo Chemicals, Inc., Sep., 1995.

*Primary Examiner*—Vasu Jagannathan
*Assistant Examiner*—John J. Guarriello

[57] ABSTRACT

The invention relates to polymeric dispersants used in formulating aqueous ink compositions, as well as inks containing those dispersants. The dispersants are graft copolymers comprising a hydrophilic polymeric segment, a hydrophobic polymeric segment incorporating a hydrolytically-stable siloxyl substituent, and a stabilizing segment, such as a reactive surfactant macromer, a protective colloid macromer, or a non-siloxyl hydrophobic monomer. The inks made with these dispersants show excellent stability, print characteristics, water-fastness, optical density, and in-use maintenance characteristics.

13 Claims, No Drawings

POLYMERIC DISPERSANTS FOR PIGMENTED INKS

This invention is related to copending application Ser. No. 08/667,269, entitled "Pigmented Inks With Polymeric Dispersants".

TECHNICAL FIELD

This invention relates to dispersants used in pigmented ink formulations for ink jet printers.

BACKGROUND OF THE INVENTION

Ink jet printing is accomplished by ejecting ink from a nozzle toward paper or another print medium. The ink is driven from the nozzle toward the medium in a variety of ways. For example, in electrostatic printing, the ink is driven by an electrostatic field. Another ink jet printing procedure, known as squeeze tube, employs a piezo-electric element in the ink nozzle. Electrically-caused distortions of the piezo-electric element pump the ink through the nozzle and toward the print medium. In still another ink jet printing procedure, known as thermal or bubble ink jet printing, the ink is driven from the nozzle toward the print medium by the formation of an expanding vapor phase bubble in the nozzle. These various printing methods are described in "Output Hard Copy Devices," edited by Durbeck and Sherr, Academic Press, 1988 (see particularly chapter 13, entitled "Ink Jet Printing").

Ink compositions for use in ink jet printers generally comprise deionized water, a water soluble or water miscible organic solvent, and a colorant. Frequently, the colorant is a soluble dye. Unfortunately, inks comprising soluble dyes can exhibit many problems, such as poor water-fastness, poor light-fastness, clogging of the jetting channels as a result of solvent evaporation and changes in the dye's solubility, dye crystallization, ink bleeding and leathering on the printed page, poor thermal stability, chemical instability, and ease of oxidation. Many of these problems can be minimized by replacing the soluble dyes used in ink formulations with insoluble pigments. In general, pigments have superior properties when compared to dyes, including good water-fastness, good light-fastness, thermal stability, oxidative stability, and compatibility with both coated/treated and plain papers.

In pigmented ink compositions, the insoluble pigment is generally stabilized in a dispersion by a polymeric component. Generally speaking, most pigment inks stabilized by polymers in aqueous media are based on an electrostatic stabilizing mechanism in which the hydrophobic group in the dispersant acts as an anchor adsorbed on the pigment particle surface through acid-base, electron donor/acceptor, Van der Waals forces, or physical absorption. In this type of system, the hydrophilic group in the dispersant is extended into the aqueous medium to keep the dispersant soluble and to set up an electrosteric layer to prevent aggregation of the particles. This results in a competition in the dispersing process between the pigment particle and the polymer, the polymer and the solvent, and the pigment particle and the solvent. In order to form a stable polymeric dispersion, several factors need to be considered. First, the polymer must be firmly anchored to the particle surface to withstand shear force and the competition of other ingredients. This requires a careful match of the polarity of the particle surface and the hydrophobic group in the dispersant. Second, there is a need to adjust the identity, length and weight of the hydrophobic group in the dispersant to fully cover the particle, otherwise, the adsorbed polymer will act as a flocculent. Third, an electrosteric layer with requisite thickness around the particle to repulse aggregation is needed. This intricate balancing becomes even more complex when the dispersion is used in inks, since it is common to add cosolvents, surfactants, defoamers, biocides and other additives to the pigmented ink to optimize its print quality, dry time and maintenance characteristics. These additives may compete with the anchor group in the dispersant to adsorb on the particle surface. Their existence may also lower the solubility of the polymer in the media especially at higher temperatures, thereby destabilizing the dispersion system. Destabilization of pigment dispersions in inks can result in flocculation of the pigment in the nozzle of the ink jet printer which can eventually adversely impact the printing process. Most prior art pigment dispersions will irreversibly clog the nozzle of ink jet printers when left standing in the atmosphere for an extended period of time (e.g., 6 hours). The result of these interrelated and competing forces is that it has been extremely difficult to formulate a polymeric dispersant for pigmented ink jet inks which simultaneously provides excellent stability, excellent water-fastness for the inks, minimized printer clogging, and excellent print density.

U.S. Pat. No. 5,085,698, Ma, et al., issued Feb. 4, 1992, discloses an ink composition comprising pigment, an aqueous medium, and an acrylic/acrylate block copolymer as a stabilizing agent. See also, U.S. Pat. No. 5,221,334, Ma, et al., issued Jun. 22, 1993.

U.S. Pat. No. 5,302,197, Wickramanayke, et al., issued Apr. 12, 1994, describes aqueous ink jet compositions comprising a pigment dispersion (pigment together with a conventional dispersing agent), an aqueous carrier medium, and a cosolvent mixture which includes a polyol/alkylene oxide condensate and a cyclic amide derivative. The polymeric dispersants utilized in these compositions are preferably block polymers containing hydrophobic and hydrophilic segments.

U.S. Pat. No. 4,597,794, Ohta, et al., issued Jul. 1, 1986, describes ink used in an ink jet recording process which contains polymeric dispersing agents including both hydrophilic and hydrophobic portions. Preferred polymeric dispersants contain N- methylol acrylamide or N-methylol methacrylamide portions.

U.S. Pat. No. 4,469,840, Alberts, et al., issued Sep. 4, 1984, discloses graft polymers which are used to treat textiles. These polymers comprise diorganopolysiloxane components, surfactant and/or water-soluble polyether components, and polymerized units of vinyl compounds which form bridges between the first two components.

U.S. Pat. No. 4,778,862, Woo, et al., issued Oct. 18, 1988, describes the synthesis of copolymers of acrylic resins, silicone resins, and fluorinated alcohols, used as binders in paint compositions.

U.S. Pat. No. 5,310,778, Schor, et al., issued May 10, 1994, describes a process for preparing ink jet inks wherein a two roll mill is charged with pigment and polymeric dispersant, the components are milled to obtain a mixture, which is then dispersed in an aqueous carrier. Polymeric dispersants disclosed as being useful in the process include graft or block polymers containing both hydrophobic and hydrophilic groups.

U.S. Pat. No. 5,418,277, Ma, et al., issued May 23, 1995, describes aqueous pigment inks which include a fluorinated block copolymer prepared from a fluorinated oxazoline or oxazine.

U.S. patent application Ser. No. 08/360,200, Beach, et al., filed Dec. 21, 1994, describes stabilizers used for pigmented inks. These stabilizers are graft polymers which contain a carboxylic acid-containing hydrophilic polymeric backbone to which is grafted a hydrophobic group, oligomer or polymer connected by the reaction of the carboxylic acid group on the backbone with the functional group on the hydrophobe. Examples of such stabilizers include aliphatic or alkyl aryl amines condensed with polyacrylic acid, amine-terminated acrylic esters condensed with polyacrylic acid, amine-terminated polyoxyalkylene polymers condensed with polyacrylic acid, and amine polymer backbones condensed with acid-containing hydrophobic segments.

U.S. patent application Ser. No. 08/360,199, Beach, et al., filed Dec. 21, 1994, describes aqueous ink compositions for ink jet printers which comprise an aqueous carrier, an insoluble pigment, and a block or graft copolymer comprising a hydrophilic polymeric segment and a hydrophobic polymeric segment having a hydrolytically stable siloxyl substituent.

It is to be noted that none of these references describe or suggest the graft copolymers of the present invention, which contain a hydrophilic polymeric segment, a hydrophobic polymeric segment incorporating a hydrolytically stable siloxyl substituent, and a stabilizing segment. These copolymers, when used as dispersants in pigment ink compositions, provide outstanding benefits in terms of composition stability, water-fastness, optical density, and printer maintenance characteristics.

SUMMARY OF THE INVENTION

The present invention relates to graft copolymers, useful as dispersants in ink jet ink compositions, having a molecular weight of from about 1,500 to about 20,000, comprising:

(a) a hydrophilic polymeric segment;

(b) a hydrophobic polymeric segment, having a molecular weight of from about 400 to about 3,000, which incorporates a hydrolytically stable siloxyl substituent; and (c) a stabilizing segment having a molecular weight of from about 200 to about 2,000, preferably selected from the group consisting of reactive surfactant macromers, protective colloid macromers and non-siloxyl hydrophobic monomers.

The present invention also relates to aqueous ink compositions which include those polymeric dispersants. Specifically, these compositions for use in ink jet printers comprise from about 0.5% to about 10% of an insoluble pigment, from about 0.25% to about 10% of the polymeric dispersant described above, and an aqueous carrier.

All percentages and ratios, used herein, are "by weight" unless otherwise specified.

DETAILED DESCRIPTION OF THE INVENTION

The present invention relates to polymeric dispersants used to stabilize aqueous pigment ink compositions, as well as pigment ink compositions containing those dispersants. The polymers of the present invention have a molecular weight of from about 1,500 to about 20,000, preferably from about 2,000 to about 10,000, most preferably about 2,500 to about 5,000. The polymers function to stabilize the pigment dispersion in the aqueous ink composition. The polymers also assist in the redispersion of the pigment after drying out of the nozzle during printer shutdown. Finally, the polymers provide for inks having good water-fastness and excellent print quality and optical density characteristics.

The polymers of the present invention are graft copolymers comprising three distinct segments: a hydrophilic polymeric segment, a hydrophobic segment which incorporates a hydrolytically stable siloxy substituent, and a stabilizing segment. Each of these segments will be described in detail below.

The hydrophilic portion of the polymer helps control polymer solubility in the ink composition. Generally, the hydrophilic segment will include acidic functional groups, such as carboxylic or sulfonic acid groups. Suitable hydrophilic polymers will be known to those skilled in the art. Preferred hydrophilic segments contain carboxyl substituents. Preferably, the hydrophilic segment is an acrylic or methacrylic polymer or a copolymer thereof. In an alternative embodiment, the hydrophilic segment can comprise an acrylic copolymer, such as a copolymer of acrylic acid with another monomer, such as styrene, which does not interfere with the hydrophilic character of the segment. Hydrophilic segments which may be used in the present invention are disclosed in U.S. Pat. No. 5,219,945, Dicker, et al., issued Jun. 15, 1993; U.S. Pat. No. 5,085,698, Ma, et al., issued Feb. 4, 1992; and U.S. Pat. No. 5,221,334, Ma, et al., issued Jun. 22, 1993, all of which are incorporated herein by reference. The hydrophilic segment comprises from about 20% to about 80% of the entire polymeric dispersant. The hydrophilic segment itself must be long enough such that it acts to provide a stabilizing function to the dispersant.

The hydrophobic polymeric segment comprises a polymer or copolymer containing a hydrolytically stable linear or branched siloxyl substituent. This segment functions as the anchor to adsorb the dispersant onto the pigment particle surface. A siloxyl substituent (an oligomeric siloxane) has the formula:

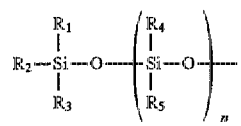

wherein n is from about 1 to about 50, preferably from about 2 to about 16, $R_1$ to $R_5$ are independently alkyl or aryl, preferably lower alkyl ($C_1$–$C_6$), phenyl or benzyl, and may optionally be substituted with a variety of non-interfering substituents. For branched siloxy substituents, $R_4$ and/or $R_5$ are siloxyl substituents. Suitably, the siloxyl substituent will be terminated with a lower alkyl group. In this formula, $R_1$ and $R_3$–$R_5$ are preferably methyl, i.e., the siloxyl substituent is a dimethyl polysiloxane; and $R_2$ is preferably butyl. Acryloyl or methacryloyl-terminated polydialkylsiloxane macromers are preferred hydrophobic polymeric segments. The siloxyl substituent is hydrolytically stable in that it does not react with water under neutral conditions.

A preferred linear or branched substituent has the formula:

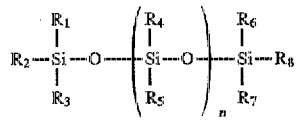

wherein n is from about 2 to about 16, and each R is independently benzyl, siloxyl, or lower alkyl ($C_1$–$C_6$, preferably $C_1$–$C_4$). In this formula, $R_1$ and $R_3$–$R_7$ are preferably methyl, $R_2$ is preferably butyl, and $R_8$ is preferably a methacryl oxypropyl group.

In a preferred embodiment, the hydrophobic segment is an acrylate or methacrylate ester (oxo or thio), or an amide polymer having a siloxyl substituent (e.g., an oligomeric siloxane grafted to a polyacrylate or polymethacrylate). Other suitable hydrophobic copolymers having a siloxyl substituent will be known to those skilled in the art. The hydrophobic segment has a molecular weight of from about 400 to about 3,000, preferably from about 400 to about 2,000, more preferably from about 800 to about 1,200, most preferably about 900.

The third segment of the copolymer, referred to herein as the stabilizing segment, also acts to help bind the dispersant to the pigment particles as well as to enhance the stabilizing efficacy of the entire polymer. The stabilizing segment is preferably selected from either a reactive surfactant or a protective colloid macromer material or a non-siloxyl hydrophobic monomer. This segment has a molecular weight of from about 200 to about 2,000, preferably from about 200 to about 1,000. The stabilizing segment must include a moiety which enables it to polymerize into the remainder of the polymer. Preferred stabilizing segments accomplish that through the inclusion of an acrylic group. Reactive surfactants contain both hydrophobic and hydrophilic moieties and not only function as surfactants in the conventional manner but also tend to effectively uniformly coat insoluble particles in a dispersion. These materials can have the properties of nonionic or anionic surfactants. Protective colloids are reactive polymers derived from cellulose (methyl cellulose, hydroxymethyl cellulose, and hydroxyethyl cellulose), polyvinyl alcohols and polyglycols. These products can provide the protective qualities of methyl cellulose, hydroxyethyl cellulose, or polyglycols without the attendant disadvantages of these products, such as water sensitivity and poor compatibility with certain compounding formulations. Non-siloxyl hydrophobic monomers may be derived from long chain aliphatic groups, long chain alcohols, and alkyl aryl alcohols. Examples of such materials would include stearyl or lauryl acrylate or methacrylate or nonyl phenol acrylate or methacrylate.

Materials which can be used as stabilizing segments are commercially available, for example, from Monomer-Polymer & Dajac Laboratories, Inc., Feasterville, Pa., and Aldrich Chemical, Milwaukee, Wis. Examples of such reactive surfactants include nonylphenoxy poly(ethyleneoxy)—acrylate (containing from 1 to about 40 moles of ethylene oxide), nonylphenoxy poly(ethyleneoxy)—methacrylate (containing from 1 to about 40 moles of ethylene oxide), nonylphenoxy poly(ethyleneoxy)—crotonate (containing from about 5 to about 40 moles of ethylene oxide), bis-[nonylphenoxy poly(ethyleneoxy)]—fumarate (containing from about 5 to about 40 moles of ethylene oxide), phenoxypoly(ethyleneoxy) acrylate (containing from about 5 to about 40 moles of ethylene oxide), perfluoroheptoxy-poly (propyloxy) acrylate, perfluoroheptoxypoly (propyloxy) methacrylate, sorbitol acrylate, sorbitol methacrylate, allyl methoxy triethylene glycol ether, monosodium ethylsulfonate monododecyl maleate, sodium allyl sulfonate, sodium methallyl sulfonate, 3-sulfopropyl acrylate, and vinyl sulfonate. Examples of protective colloid materials include hydroxyethylcellulose acrylate, hydroxyethylcellulose methacrylate, methoxypoly(ethyleneoxy) acrylate (containing from about 5 to about 40 moles of ethylene oxide), methoxypoly(ethyleneoxy) methacrylate (containing from about 5 to about 40 moles of ethylene oxide), methylcellulose acrylate, methylcellulose methacrylate, methylcellulose crotonate, stearyloxypoly (ethyleneoxy) acrylate (containing from 1 to about 40 moles of ethylene oxide), and stearyloxypoly(ethyleneoxy) methacrylate (containing from about 10 to about 40 moles of ethylene oxide). Mixtures of these materials may be used.

Preferred stabilizing segments which may be used in the polymers of the present invention include stearyl acrylate, stearyl methacrylate, lauryl acrylate, lauryl methacrylate, nonylphenol acrylate, nonylphenol methacrylate, nonylphenoxy poly(ethyleneoxy)$_n$ methacrylate, wherein n is from 1 to about 40, preferably from 6 to about 15; nonylphenoxy poly(ethyleneoxy)$_n$ acrylate, wherein n is from 1 to about 40, preferably from about 6 to about 15; methoxypoly (ethyleneoxy)$_n$ methacrylate, wherein n is from about 5 to about 40, preferably from about 5 to about 15; methoxypoly (ethyleneoxy)$_n$ acrylate, wherein n is from about 5 to about 40, preferably from about 5 to about 15; stearyloxypoly (ethyleneoxy)$_n$ methacrylate, wherein n is from about 1 to about 20; stearyloxypoly(ethyleneoxy)$_n$ acrylate, wherein n is from about 1 to about 20; perfluoro or highly fluorinated $C_1$–$C_{18}$ alkyl methacrylate; perfluoro or highly fluorinated $C_1$–$C_{18}$ alkyl acrylate (such as trihydroperfluoro undecyl methacrylate and trihydroperfluoro undecyl acrylate); poly (propylene glycol) methyl ether methacrylate; poly (propylene glycol) methyl ether acrylate; poly(propylene glycol) 4-nonylphenol ether methacrylate; poly(propylene glycol) 4-nonylphenol ether acrylate; methacryloxy-trimethylsiloxy-terminated polyethylene oxide, and acryloxy-trimethylsiloxy-terminated polyethylene oxide. Particularly preferred stabilizing segments include stearyl methacrylate (having a molecular weight of about 325), stearyl acrylate, lauryl methacrylate, lauryl acrylate, nonylphenoxy PEG-10 methacrylate, trimethylsiloxy-terminated PEG 4–5 methacrylate, PPG-4-nonylphenol acrylate, and trihydroperfluoro undecyl methacrylate. Stearyl methacrylate is particularly preferred. Mixtures may be used.

The graft copolymers of the present invention can be made by standard synthetic techniques such as those described in Steven's Polymer Chemistry, An Introduction, Oxford University Press (1990), the disclosure of which is incorporated herein by reference. Free radical polymerization is the preferred method of synthesis. Such a free radical polymerization reaction utilizes initiators and chain transfer agents to control the polymer molecular weight. Any conventional free radical initiator and chain transfer agent materials known in the art may be used in the present invention as long as they are compatible with the reactants being utilized. Preferred free radical initiators are of the azo-type or peroxide-type (preferably the azo-type) and preferred chain transfer agents include $C_4$ to $C_{18}$ (preferably $C_{12}$ to $C_{16}$) alkylthiol groups. Particularly preferred is n-$C_{12}$ thiol.

The molecular weight of the dispersant polymer is from about 1,500 to about 20,000, preferably from about 2,000 to about 10,000. It is preferred that the ratio in the polymeric dispersant be from about 10 to about 100 hydrophilic monomers to 1 siloxane hydrophobic macromer, preferably from about 15 to about 50 hydrophilic monomers to about 1 siloxane hydrophobic macromer. The ratio of siloxane hydrophobic macromer to stabilizing monomer/macromer is from about 1 to about 2 siloxane hydrophobic macromer to from about 1 to about 5 stabilizing monomer/macromer segments (preferably about 1:1).

A particularly preferred polymeric dispersant of the present invention is one having the following structural formula

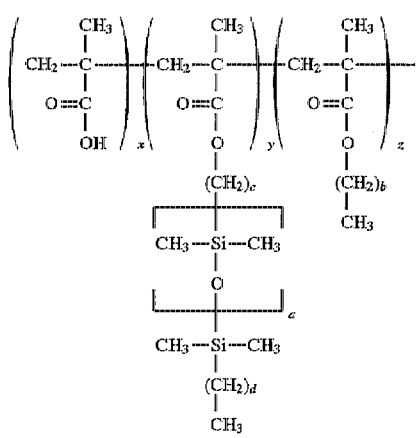

wherein x is from about 5 to about 100, preferably from about 15 to about 50; y is from about 1 to about 2, most preferably about 1; z is from about 1 to about 5, preferably from about 1 to about 2, most preferably about 1; a is from about 3 to about 45, preferably from about 3 to about 24, most preferably about 9; b is from about 3 to about 29, preferably from about 5 to about 17, most preferably from about 15 to about 17; c is from about 2 to about 8, preferably about 3; and d is from 0 to about 7, preferably about 3.

The aqueous ink compositions of the present invention comprise from about 0.5% to about 10% of an insoluble pigment, from about 0.25% to about 10%, preferably from about 0.5% to about 5%, of the polymeric dispersant discussed above, and an aqueous carrier.

A wide variety of organic and inorganic pigments, alone or in combination, may be selected for use in the aqueous inks of the present invention. The key selection criteria for the pigment is that they must be dispersable in the aqueous medium. The term "pigment", as used herein, means an insoluble colorant. The pigment particles are sufficiently small to permit free flow of the ink through the ink jet printing device, especially at the ejecting nozzles that usually have a diameter ranging from about 10 microns to 50 microns. The particle size also has an influence on pigment dispersion stability, which is critical throughout the life of the ink. It is also desirable to use small particles for maximum color strength and gloss. The range of useful particle size is from approximately 0.05 micron to approximately 15 microns. Preferably, the pigment particle size should range from about 0.05 micron to about 5 microns and, most preferably, from about 0.05 micron to about 1 micron. Useful pigments are described in U.S. Pat. No. 5,085,698, Ma, et al., issued Feb. 4, 1992, incorporated herein by reference.

The selected pigment may be used in dry or wet form. For example, pigments are usually manufactured in aqueous media and the resulting pigment is obtained as water wet presscake. In presscake form, the pigment is not agglomerated to the extent that it is in dry form. Thus, pigments in water wet presscake form do not require as much deflocculation in the process of preparing the inks as do dry pigments.

Fine particles of metal or metal oxides may also be used to practice the invention. For example, metal and metal oxides are suitable for the preparation of magnetic ink jet inks. Fine particle size oxides, such as silica, alumina, titania, and the like, may also be used. Furthermore, freely divided metal particles, such as copper, iron, steel, aluminum and alloys, may be selected for appropriate applications.

Pigments suitable for use in the present invention include, for example, azo pigments, such as azo lakes, insoluble azo pigments, condensed azo pigments and chelate azo pigments, polycyclic pigments, perylene pigments, anthraquinone pigments, quinacridone pigments, dioxazine pigments, thioindigo pigments, isoindolinone pigments, quinophthalone pigments, and dry lakes. Useful organic pigments include nitro pigments, nitroso pigments, aniline black and daylight fluorescent pigments. Preferred pigments include titanium oxide, iron oxide, and carbon black. Examples of commercially available pigments which may be used in the present invention include the following: Heliogen® Blue L 6901F (BASF), Heliogen® Blue NBD 7010 (BASF), Heliogen® Blue K 7090 (BASF), Heucophthal® Blue G XBT-583D (Heubach), Irgalite® Rubine 4BL (Ciba-Geigy), Quindo® Magenta (Mobay), Indofast® Brilliant Scarlet (Mobay), Hostaperm® Scarlet GO (Hoechst), Permanent Rubine F6B (Hoechst), Monastral® Scarlet (Ciba-Geigy), Raven® 1170 (Col. Chem.), Special Black 4A (Degussa), Black FW18 (Degussa), Sterling® NS Black (Cabot), Sterling® NSX 76 (Cabot), Monarch® 880 (Cabot), Tipure® R-101 (DuPont), Mogul L (Cabot), BK 8200 (Paul Uhlich), Heliogen® Green K 8683 (BASF), Heliogen® Green L 9140 (BASF), Monastral® Red B (Ciba-Geigy), Monastral® Violet R (Ciba-Geigy), Hostaperm® Orange GR (Hoechst), Paliogen® Orange (BASF), L75-2377 Yellow (Sun Chem.), L74-1357 Yellow (Sun Chem.), Hostaperm® Yellow H4G (Hoechst), Irgazin® Yellow 5GT (Ciba-Geigy), Permanent Yellow G3R-01 (Hoechst), Novoperm® Yellow FGL (Hoechst), Chromophthal® Yellow 3G (Ciba-Geigy), Hansa Yellow X (Hoechst), Dalamar® Yellow YT-858-D (Heubach), and Hansa Brilliant Yellow 5GX-02 (Hoechst).

The amount of pigment used in the inks may vary depending on their structure, but generally the pigments are used in a range of from about 0.5% to about 10%, preferably from about 2 to about 6%, by weight of the ink composition. The pigment to dispersant (weight) ratio is preferably about 3:1, but may vary from about 1:1 to about 6:1.

The third component of the ink composition of the present invention is the aqueous carrier medium which is generally present at from about 80% to about 99% of the composition. The aqueous carrier medium comprises water (preferably deionized water) and, preferably, at least one water soluble organic solvent. Selection of a suitable carrier mixture depends on the requirements of the specific application involved, such as desired surface tension and viscosity, the selected pigment, the desired drying time of the ink, and the type of paper onto which the ink will be printed. Representative examples of water soluble organic solvents that may be selected include (1) alcohols, such as methyl alcohol, ethyl alcohol, n-propyl alcohol, iso-propyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols, such as acetone, methyl ethyl ketone and diacetone alcohol; (3) ethers, such as tetrahydrofuran and dioxane; (4) ethers, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol, 1,2,6-hexanetriol and thiodiglycol; (6) lower alkyl mono- or di-ethers derived from alkylene glycols, such as ethylene glycol monomethyl (or monoethyl) ether, diethylene glycol monomethyl (or monoethyl) ether, propylene glycol monomethyl (or monoethyl) ether, triethylene glycol monomethyl (or monoethyl) ether and diethylene glycol dimethyl (or diethyl) ether; (7) nitrogen-containing cyclic compounds, such as pyrrolidone, N-methyl-2-pyrrolidone, and 1,3-dimethyl-2-imidazolidinone; and (8) sulfur-containing compounds, such as dimethyl sulfoxide and tetramethylene sulfone. Other useful organic solvents include lactones and lactams.

Preferred water soluble organic solvents include polyhydric alcohols, such as ethylene glycol, propylene glycol, butylene glycol, triethylene glycol, 1,2,6-hexanetriol, thiodiglycol, hexylene glycol, and diethylene glycol; diols, such as butanediol, pentanediol, hexanediol and homologous diols; glycol ethers, such as propylene glycol laureate; glycerol; polyalkyl glycols, such as polyethylene glycol; and lower alkyl ethers of polyhydric alcohols, such as ethylene glycol monomethyl or monoethyl ether, diethylene glycol methyl or ethyl ether, and triethylene glycol monomethyl or monoethyl ether. Particularly preferred organic solvents include ethylene glycol, diethylene glycol, and tetraethylene glycol.

Mixtures of these solvents may be used in the present invention. A particularly preferred organic solvent for use in the present invention is 1,3-propanediol or 1,4-butanediol which may be used either alone or in combination with other organic solvents particularly (1) polypropylene glycols and mixed polyethylene polypropylene glycols having molecular weights of from about 200 to about 600 (polyethylene glycol 200–600 is particularly preferred); or (2) polyol/alkylene oxide condensates having the formula

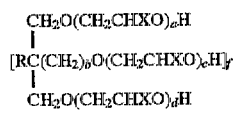

wherein X is hydrogen or methyl, R is H, $CH_3$, $C_2H_5$, $C_3H_7$, $C_4H_9$, or $CH_2O(CH_2CH_2O)_eHX$; b is 0 or 1; a+d+f (c+e) =about 2 to about 100; and f is from about 1 to about 6. An example of such a polyol/alkylene oxide condensate is Liponic EG-1, commercially available from Lipo Chemicals Co., Paterson, N.J., wherein R=H, b=0, f=1, X=H and a+d+f (c+e)=26.

In the instance where the aqueous carrier medium contains a mixture of water and organic solvent, that mixture usually contains from about 25% water/75% organic solvent to about 95% water/5% organic solvent. The preferred ratios range from approximately 50% water/50% organic solvent to approximately 95% water/5% organic solvent. Percentages are based on the total weight of the aqueous carrier medium, not the entire composition.

The ink compositions of the present invention are manufactured using procedures well known in the art, such as those described in U.S. Pat. No. 5,085,698, Ma, et al., issued Feb. 4, 1992, incorporated herein by reference. The ink is preferably prepared by mixing the pigment, dispersant and deionized water together in an attritor to form a concentrate. The pigment concentrate is ground until the appropriate particle size is obtained. The concentrate is then diluted with water and the appropriate formulation components added to give the desired ink. Optionally, surfactants may be added to modify the surface tension of the ink and to control the penetration of the ink into the paper. Suitable surfactants include nonionic, amphoteric and ionic surfactants. Other additives, such as biocides, humectants, chelating agents, and viscosity modifiers, may be added to the ink composition at their art-established levels.

The following examples are detailed descriptions of methods of preparation and use of the polymeric dispersants and the ink compositions of the present invention. The detailed descriptions fall within the scope of, and serve to exemplify, the more general description set forth above. The examples are presented for illustrative purposes only, and are not intended as a restriction on the scope of the invention.

EXAMPLE 1

A polymeric dispersant of the present invention is made as follows.

A solution of methacrylic acid 22.8 g (265 mmol), monomethacryloxypropyl-terminated polydimethylsiloxane (PDMS-MA) 7.84 g (8.7 mmol, MW 900), nonylphenol PEG-10 methacrylate 6.33 g (8.7 mmol), dodecanethiol 2.06 g (9.9 mmol), dimethyl 2,2'-azobisisobutyrate (V-601) 0.64 g (2.84 mmol) and isopropyl alcohol 100 mL is degassed with argon (done by repeated partial evacuation followed by argon backfill using a Firestone Valve) and then heated to 70° C. for 16 hours. The mixture is allowed to cool to room temperature and then added slowly to rapidly stirred hexane 1.0 L. The resulting solid is isolated by vacuum filtration and dried in vacuum overnight at 80° C. The yield of the reaction varies from 85% to 90%. The co-polymer is characterized by proton NMR and GPC.

The co-polymer dispersant stock solution is prepared as follows: A 400 mL beaker containing 40 g of DI water is set on a hot plate with a magnetic stirrer. The co-polymer, 12 g, is added to the beaker while stirring, then 18 g of 20% KOH is added to the system. The mixture is heated to 50° C. for 2 hours. The pH is adjusted to 7.5 by addition of 20% KOH. Then DI water is added to bring the total weight to 100 g.

| Preparation A | |
|---|---|
| Components | Amount |
| Carbon Black (Degussa Corp., Special Black 4A) | 27.0 g |
| MAA-co-PDMS-co-Nonylphenol-PEG-10-MA stock solution | 75.0 g |
| DI Water | 52.4 g |
| Ethylene glycol | 25.6 g |

| Preparation B | |
|---|---|
| Components | Amount |
| Carbon Black (Degussa Corp., FW18) | 20.3 g |
| MAA-co-PDMS-co-Nonylphenol-PEG-10-MA | 67.5 g |
| DI Water | 92.2 g |

Preparations A and B are made as follows. The components are premixed by mechanical stirring until there are no visible lumps. The mixture is dispersed by an attrition process using a Szegvari attritor model 01 std with 10–12 mesh zirconium silicate shot at a speed of 700 rpm. The attrition process is typically performed for a minimum of one hour, however, longer times at controlled temperature can also be used. The carbon black dispersion mix is removed from the attritor and let down, by the addition of DI water, to a final premix percent solids of 17.5%.

Ink A.

An ink is prepared by mixing the concentrated premix dispersion Preparation A with ethylene glycol and DI water. The biocide Proxel® GXL commercially available from Zeneca, is also added. The formulation is given below:

| Components | Amount |
| --- | --- |
| Premix Dispersion Preparation A | 38.0 g |
| Ethylene Glycol | 19.5 g |
| DI Water | 75.0 g |
| Proxel® GXL | 0.27 g |

The final pH of the ink is adjusted to 8.0 by the addition of 20% KOH. The ink is filtered through a series of filters with the final filter being 1.2 microns. The median particle size determined by Leeds and Northrop Microtrac UPA 150 measurement is about 190 nm.

Ink B

An ink composition is prepared, using the same procedure as for Ink A, above, except that MAA-co-PDMS-co-Trimethylsiloxy-terminated PEG (4–5) Methacrylate is used as the dispersant.

Ink C

An ink composition is prepared, using the same procedure as for Ink A, above, except that MAA-co-PDMS-co-Stearyl Methacrylate is used as the dispersant.

Ink D

An ink composition is prepared, using the same procedure as for Ink A above, except that MAA-co-PDMS-co-PPG-4-Nonylphenol acrylate is used as the dispersant.

Ink E

An ink is prepared by mixing the concentrated premix dispersion Preparation B with diethylene glycol, tetraethylene glycol and DI water.

| Components | Amount |
| --- | --- |
| Premix Dispersion Preparation B | 83.3 g |
| Diethylene Glycol | 15.0 g |
| Tetraethylene Glycol | 5.0 g |
| DI Water | 96.3 g |
| Proxel® GXL | 0.4 g |

The final pH of the ink is adjusted to 8.0 by the addition of 20% KOH. The ink is filtered through a series of filters with the final filter being 1.2 microns. The median particle size is about 140 nm.

Ink F

An ink composition is prepared, using the same procedure as for Ink E, above, except that MAA-Co-PDMS-Co-Trimethylsiloxy-terminated PEG 4–5 methacrylate is used as dispersant.

Ink G

An ink composition is prepared, using the same procedure as for Ink E, above, except that MAA-co-PDMS-co-Stearyl Methacrylate is used as dispersant.

Ink H

An ink composition is prepared, using the same procedure as for Ink E, above, except that MAA-Co-PDMS-Co-PPG-4-Nonylphenol acrylate is used as dispersant.

Print testing of ink

The inks described above are print tested using an IBM Model IJ4076 printer, manufactured by Lexmark International. The print samples are generated on IBM Multisystem bond paper and are tested using the following procedures:

Optical density: measured by a Macbeth densitometer. All inks show a good optical density.

Water-fastness: Print samples are soaked in DI water for 5 minutes. After drying, the optical density of the samples are measured and compared to the presoaked optical density. The optical densities of the soaked samples are 99–100% of the presoaked optical densities.

Maintenance testing: Capping stations of a Lexmark 4076 printhead are disabled to leave the printhead uncapped when the printer is not printing. The printer is left in standby mode for 6 hours at ambient condition. The printer is then activated and run for 6750 heater fires for each of the 56 nozzles of the printhead. The recovery of the nozzles of the printhead are observed to see if any remain clogged. These tests show recovery for all 56 nozzles in the printhead when the inks of the present invention are used.

Stability testing: The inks are placed in an oven at 60° C. to examine their stability. Change in the particle size is monitored weekly for 5 weeks. Little, if any, change in particle size is seen.

Dry time test: The inks of the present invention show good dry times which are, in fact, less than similar inks which use a dispersant which does not include the stabilizing segment.

EXAMPLE 2

A second polymeric dispersant of the present invention is made as follows.

A solution of methacrylic acid 22.8 g (265 mmol), monomethacryloxypropyl-terminated polydimethylsiloxane (PDMS-MA) 7.84 g (8.7 mmol, MW 900), stearyl methacrylate 2.95 g (8.7 mmol), dodecanethiol 2.06 g (9.9 mmol), dimethyl 2,2'-azobisisobutyrate 0.64 g (2.84 mmol) and isopropyl alcohol 100 mL is degassed with argon (done by repeated partial evacuation followed by argon backfill using a Firestone Valve) then heated to 70° C. for 16 hours. The mixture is allowed to cool to room temperature and then added slowly to rapidly stirred hexane 1.0 L. The resulting solid is isolated by vacuum filtration and dried in vacuum overnight at 80° C. The yield of the reaction is about 85%. The co-polymer is characterized by proton NMR and GPC.

This polymeric dispersant is formulated into a pigment ink composition as described in the present application. The ink composition shows excellent stability, print characteristics, water-fastness, optical density, and in-use printer maintenance characteristics.

What is claimed is:

1. A graft copolymer, having a molecular weight of from about 1,500 to about 20,000, comprising:
   a) a hydrophilic polymeric segment;
   b) a hydrophobic polymeric segment, having a number average molecular weight of from about 400 to about 3,000, which incorporates a siloxyl substituent; and
   c) a stabilizing segment, having a number average molecular weight of from about 200 to about 2,000, prepared from members selected from the group consisting of reactive surfactant macromers, protective colloid macromers, and non-siloxyl containing hydrophobic monomers.

2. The copolymer according to claim 1 wherein the monomer ratio (a):(b) is from about 10:1 to about 100:1 and the monomer ratio (b):(c) is from about 2:1 to about 1:5.

3. The copolymer according to claim 2 wherein the hydrophilic polymeric segment contains a carboxy substituent.

4. The copolymer according to claim 3 wherein the hydrophobic polymeric segment is an acryloyl- or methacryloyl-terminated polydialkylsiloxane macromer.

5. The copolymer according to claim 4 wherein the stabilizing segment is selected from the group consisting of stearyl acrylate, stearyl methacrylate, lauryl acrylate, lauryl methacrylate, nonylphenol acrylate, nonylphenol methacrylate, nonylphenoxy poly(ethyleneoxy)$_n$ methacrylate, wherein n is from about 1 to about 40; nonylphenoxy poly(ethyleneoxy)$_n$ acrylate, wherein n is from about 1 to about 40; methoxypoly(ethyleneoxy)$_n$ methacrylate, wherein n is from about 5 to about 40; methoxypoly(ethyleneoxy)$_n$ acrylate, wherein n is from about 5 to about 40; stearyloxypoly(ethyleneoxy)$_n$ methacrylate, wherein n is from about 1 to about 20; stearyloxypoly(ethyleneoxy)$_n$ acrylate, wherein n is from about 1 to about 20; fluorinated $C_1$–$C_{18}$ alkyl methacrylate; fluorinated $C_1$–$C_{18}$ alkyl acrylate; poly(propylene glycol) methyl ether methacrylate; poly(propylene glycol) methyl ether acrylate; poly(propylene glycol) 4-nonylphenol ether methacrylate; poly(propylene glycol) 4-nonylphenol ether acrylate; methacryloxy-trimethyl siloxy-terminated polyethylene oxide; acryloxy-trimethylsiloxy-terminated polyethylene oxide; and mixtures thereof.

6. The copolymer according to claim 5 wherein the hydrophilic polymeric segment is an acrylate or methacrylate polymer.

7. The copolymer according to claim 6 wherein the hydrophobic polymeric segment has a number average molecular weight of from about 400 to about 2,000 and incorporates a dimethylpolysiloxy substituent.

8. The copolymer according to claim 7 having a number average molecular weight of from about 2,000 to about 10,000.

9. The copolymer according to claim 8 wherein the stabilizing segment is selected from the group consisting of stearyl methacrylate, stearyl acrylate, lauryl methacrylate, lauryl acrylate, nonylphenol poly(ethylene glycol)-10 methacrylate, trimethylsiloxy-terminated poly(ethylene glycol) 4–5 methacrylate, poly(propylene glycol)-4-nonylphenol acrylate, and trihydroperfluoro undecyl methacrylate.

10. The copolymer according to claim 1 having the formula:

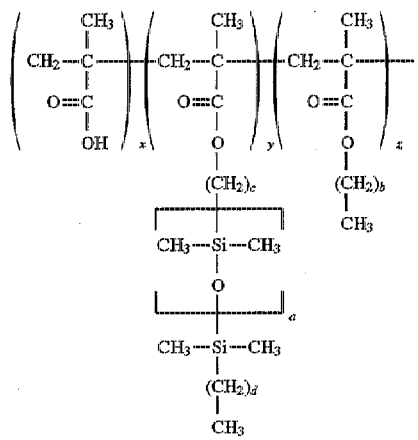

wherein x is from about 5 to about 100, y is from about 1 to about 2, z is from about 1 to about 5, a is from about 3 to about 45, b is from about 3 to about 29, c is from about 2 to about 8, and d is from 0 to about 7.

11. The copolymer according to claim 10 wherein the chain terminating segment is selected from $C_4$–$C_{18}$ alkylthiol groups.

12. The copolymer according to claim 11 wherein x is from about 15 to about 50, y is about 1, z is about 1, a is about 9, b is from about 15 to about 17, c is about 3 and d is about 3.

13. A copolymer comprising:
(a) a hydrophilic polymeric segment;
(b) a hydrophobic polymeric segment, having a molecular weight of from about 400 to about 3,000, which incorporates a hydrolitically stable siloxyl substituent; and
(c) a stabilizing segment, having a molecular weight of from about 200 to about 2,000, selected from the group consisting of reactive surfactant macromers, protective colloid macromers, and non-siloyxl hydrophobic monomers.

* * * * *